May 30, 1939. C. W. HINES Re. 21,101

WELDING APPARATUS

Original Filed July 31, 1936 2 Sheets-Sheet 1

Inventor:
Clarence W. Hines,
By Wyman, Smith, Lee, Christian & Wiles,
Attys.

WELDING APPARATUS

Original Filed July 31, 1936 2 Sheets-Sheet 2

Inventor:
Clarence W. Hines,
By Dyrenforth, Lee, Christian & Wiles,
Attys.

UNITED STATES PATENT OFFICE 21,101

WELDING APPARATUS

Clarence W. Hines, Chicago, Ill., assignor to Chicago Bridge & Iron Company, Chicago, Ill., a corporation of Illinois Original No. 2,101,856, dated December 14, 1937, Serial No. 93,699, July 31, 1936. Application for reissue February 2, 1939, Serial No. 254,329

5 Claims. (Cl. 113—99)

This invention relates to improvements in welding apparatus and, more especially, such apparatus adapted for use in the welding of steel sheets or plates.

In the manufacture of steel tanks, and the like, using sheets of steel, it is desirable in accordance with present practice to butt-weld the edges of the sheets. In making tanks in this way, difficulty has been encountered in alining and holding the sheets to properly place and locate them preparatory to the welding of the edges. By the use of my improved apparatus, the sheets of steel may be properly alined and held with their edges in proper position for welding.

My improved apparatus is cheap to manufacture, strong and rugged, and greatly facilitates the welding of various members, especially the edges of steel sheets as mentioned above.

Other features and advantages of my invention will appear more fully as I proceed with my specification.

In that form of device embodying the features of my invention shown in the accompanying drawings—

Figure 1:
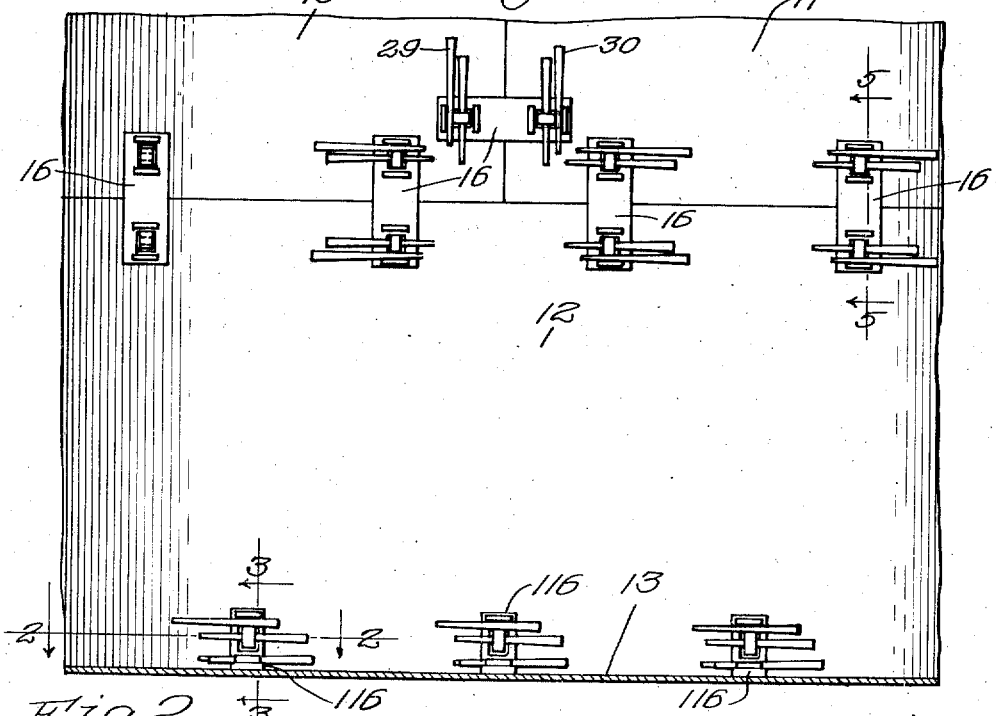
Figure 2:
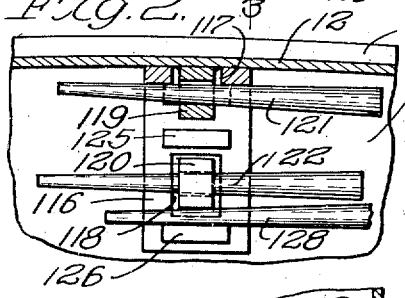
Figure 3:
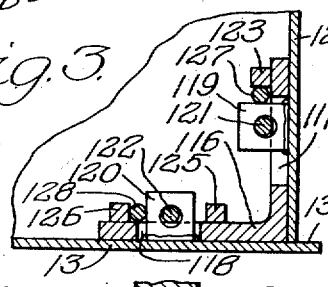
Figure 4:
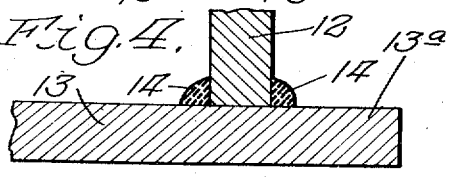
Figure 7:
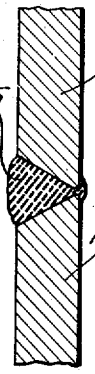
Figure 5:
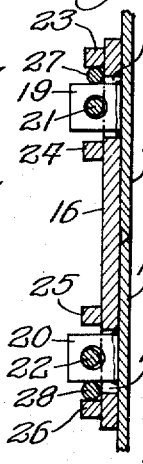
Figure 6:
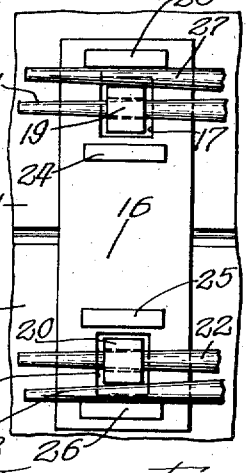
Figure 8:
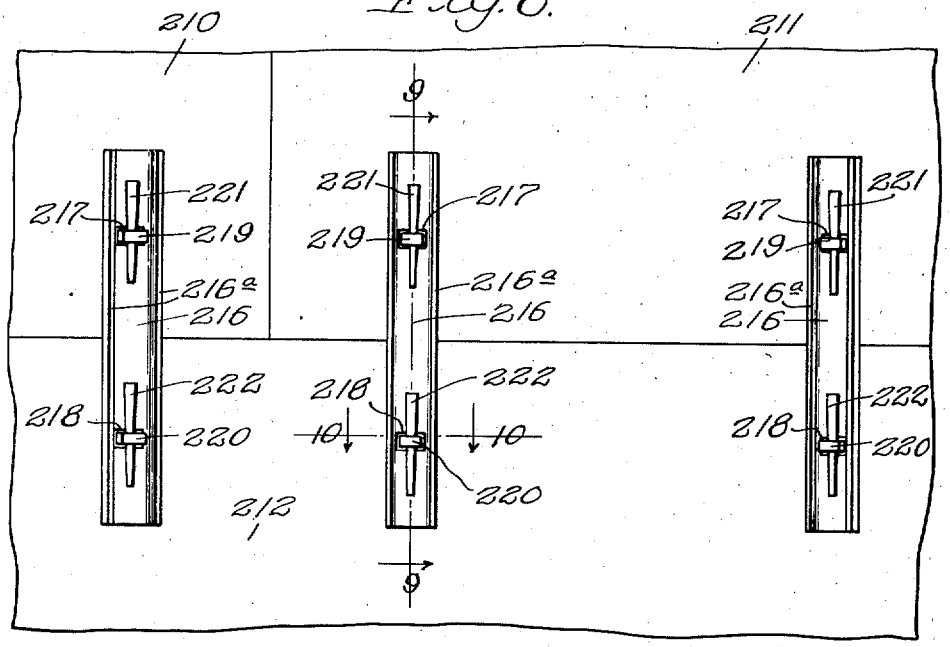
Figure 9:
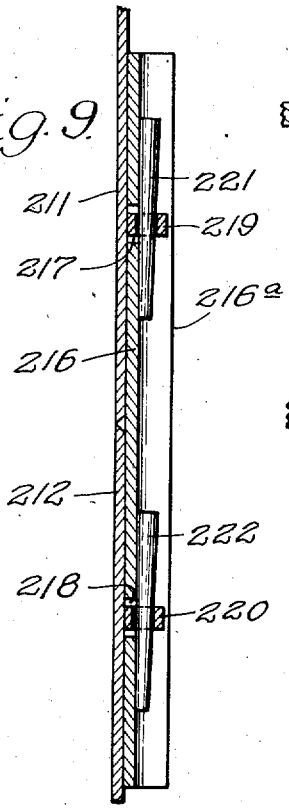
Figure 10:
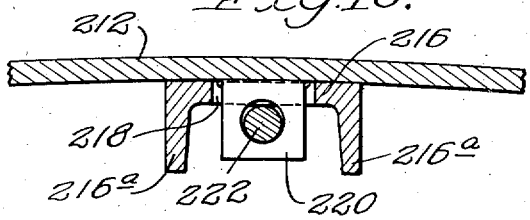
Figure 11:
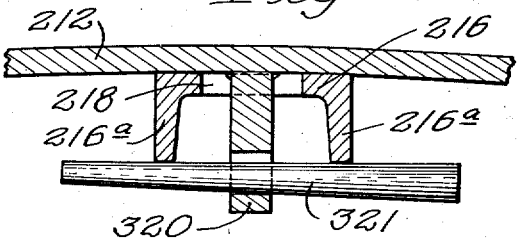

Figure 1 is a view in side elevation of a portion of a steel structure, for example, a tank, showing some bottom and side plates in position for the butt-welding of their edges; Fig. 2 is a view taken as indicated by the line 2 of Fig. 1; Fig. 3 is a view taken as indicated by the line 3 of Fig. 1; Fig. 4 is an enlarged vertical sectional view showing the welding of a side sheet onto a bottom sheet; Fig. 5 is a view taken as indicated by the line 5 of Fig. 1; Fig. 6 is an enlarged view in front elevation of my improved welding apparatus; Fig. 7 is a sectional view showing the welding of two adjacent edges of the side sheets of a tank or similar structure; Fig. 8 is a view similar to Fig. 1, showing a modified form; Fig. 9 is a view taken as indicated by the line 9 of Fig. 8; Fig. 10 is a view taken as indicated by the line 10 of Fig. 8; and Fig. 11 is a view similar to Fig. 10, showing a modification.

As shown in the drawings, 10, 11 and 12 may indicate sheets or plates of steel forming the side wall, for example, of a cylindrical tank and 13, one of the bottom sheets. The side sheets are butt-welded together and the bottom of the lower side sheet 12 meets the bottom sheet 13 at right angles, as shown in Fig. 4, so that the bottom sheet has a projecting margin 13a outside of the side sheet 12. 14, 14 indicate the welding of the sheets. In Fig. 7, 15 indicates the welding of the edges of the sheets 11 and 12.

I shall first describe the apparatus used for holding the side sheets 11 and 12 or 10 and 11. This includes a rectangular plate 16 with two square holes 17 and 18 adapted to receive apertured holding lugs 19 and 20 on the sheets 11 and 12. 21 and 22 indicate wedges adapted to be driven through the apertures in the holding lugs 19 and 20 to draw the sheets 11 and 12 against the plate 16 to bring these sheets into the same plane.

The plate 16 is provided with bars 23 and 24 above and below the upper hole 17 and similar bars 25 and 26 above and below the lower hole 18. The sides of these bars form shoulders adjacent the apertures 17 and 18. 27 indicates a wedge adapted to be driven between the bar 23 and the holding lug 29 in order to shift the sheet 11 laterally with respect to the plate 16. I am using the term "laterally" to indicate the shifting of a sheet in any direction in the same plane. That is, the side sheets by proper positioning of the apparatus may be shifted upwardly, downwardly or sidewise; and, likewise, the bottom sheet may be shifted in any direction in its own plane. A wedge driven between the bar 24 and the holding lug 19 will serve to shift the sheet upwardly. In like manner, the sheet 12 may shift either downwardly or upwardly by means of a wedge between the holding lug 20 and the bar 25 or 26. The wedge 28 is shown in the latter position to shift the sheet 12 upwardly.

The improved welding apparatus is also shown between sheets 10 and 11 and it will be seen that in this position the wedges 29 and 30 can be used to shift the sheets 10 and 11 sidewise with respect to the plate 16.

The holding lugs 19 and 20 may be attached to the sheets 11 and 12 in any suitable manner as by welding and may be removed after the edges of the sheets have been permanently welded together.

In Figs. 2 and 3, I have shown the invention adapted for holding a side sheet 12 in proper position to have its lower edge welded to the upper surface of a bottom sheet 13. As here shown, the holding plate 16 instead of being flat is angular. I have indicated this plate by the numeral 116. Its upper flange has the hole 117 and its lower flange, the hole 118, these holes adapted to receive the holding lugs 119 and 120 attached to the side sheet 12 and bottom sheet 13, respectively. The wedges 121 and 122 are utilized to draw the sheets tightly against the plate 116. Above the hole 117 is the bar 123 and at the two sides of the hole 118 are the bars 125 and 126. The wedge 127 is utilized to shift the sheet 12 downwardly with respect to the plate 116 until its lower edge is in proper position on the bottom sheet 13 for welding. The wedge 128 is utilized to shift the bottom sheet 13 laterally with respect to the plate 116 to provide the proper projecting marginal edge 13a prior to the welding operation.

In Fig. 8, I have shown a modified form. As here shown, 210, 211 and 212 may also indicate sheets or plates of steel forming the side wall, for example, of a cylindrical tank. For holding the sheets 210 and 212 or 211 and 212 together, I provide plates 216 with reinforcing flanges 216a. The plates 216 with the reinforcing flanges 216a may be formed by using channel irons.

The plates 216 are provided with apertures 217 and 218 adapted to receive apertured holding lugs 219 and 220 on the sheets 211 and 212. 221 and 222 indicate wedges adapted to be driven through the apertures in the holding lugs 219 and 220 to draw the sheets 211 and 212 against the plates 216 to bring these sheets into the same plane. If desired, the aperture holding lugs may be turned at an angle of 90° when fastened to the sheet 212, as shown in Fig. 11, and in such case the holding lug 320 is made somewhat longer so that its aperture will lie mostly above the tops of the flanges 216a, as shown in Fig. 11. When so used, the wedge 321 may lie on top of the flanges 216a.

Although I have shown and described above the apertures as particularly applied for use in the welding of sheets of steel, it is obvious that it may be employed in connection with the welding of members of any kind. The use of channel members as shown in Figs. 8 to 11 is particularly useful in connection with the welding of cylindrical surfaces, such as shown in Figs. 10 and 11. The use of the invention permits the establishment of a welding procedure which takes cognizance of the fact that shrinkage from welding is mostly across the joint, there being very little, if any, shrinkage in the direction parallel to the joint.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I claim as new, and desire to secure by Letters Patent, is:

1. Welding apparatus, including: a plate apertured to receive apertured holding lugs on members to be welded together; wedges adapted to be driven through the apertures in the holding lugs to draw the members against the plate; a shoulder on the plate adjacent an aperture in it; and a wedge adapted to be driven between a holding lug and the shoulder to shift the member laterally with respect to the plate.

2. Welding apparatus, including: apertured holding lugs adapted to be attached to members to be welded together; a plate apertured to receive said apertured holding lugs when attached to members to be welded together; wedges adapted to be driven through the apertures in the holding lugs to draw the members against the plate; a shoulder on the plate adjacent an aperture in it; and a wedge adapted to be driven between a holding lug and the shoulder to shift the member laterally with respect to the plate.

3. Welding apparatus, including: an angular plate apertured to receive apertured holding lugs on members to be welded together in angular relationship; wedges adapted to be driven through the apertures in the holding lugs to draw the members against the plate; a shoulder on the plate adjacent an aperture in it; and a wedge adapted to be driven between a holding lug and the shoulder to shift the member laterally with respect to the plate.

4. Welding apparatus, including: apertured holding lugs adapted to be attached to members to be welded together; an angular plate apertured to receive said apertured holding lugs when attached to members to be welded together in angular relationship; wedges adapted to be driven through the apertures in the holding lugs to draw the members against the plate; a shoulder on the plate adjacent an aperture in it; and a wedge adapted to be driven between a holding lug and the shoulder to shift the member laterally with respect to the plate.

5. Welding apparatus, including: a plate apertured to receive an apertured holding lug on a member to be welded to another member; a wedge adapted to be driven through said aperture in said holding lug to draw said member against said plate; a shoulder on said plate adjacent said aperture; a wedge adapted to be driven between said holding lug and said shoulder to shift said member laterally with respect to said plate when said member is drawn against said plate; and means for attaching said plate to said other member.

CLARENCE W. HINES.